United States Patent [19]
de Gramont et al.

[11] 3,717,572
[45] Feb. 20, 1973

[54] PROCESS OF FRACTIONATING HYDROCARBON MIXTURES CONTAINING OLEFINS AND ITS APPLICATION TO THE PURIFICATION OF ISOOLEFINS

[75] Inventors: Arnaud Marie-Jose de Gramont; Jean Maurin, both of Seine-Maritime, France

[73] Assignee: Compagnie Francoise De Raffinage, Paris, Seine, France

[22] Filed: Jan. 27, 1971

[21] Appl. No.: 110,346

Related U.S. Application Data

[63] Continuation of Ser. No. 767,005, Oct. 10, 1968, abandoned.

[30]    Foreign Application Priority Data

Oct. 12, 1967   France.............................67124217
Oct. 12, 1967   France..............................67/24218

[52] U.S. Cl. .........208/310, 260/677 AD, 252/455 Z
[51] Int. Cl. .............................................C10g 25/04

[58] Field of Search .208/310; 260/676 MS, 677 AD; 252/455 Z

[56]              References Cited

UNITED STATES PATENTS 3,374,182   3/1968   Young..............................252/455 Z

FOREIGN PATENTS OR APPLICATIONS

1,302,684   7/1962   France..........................260/677 AD

*Primary Examiner*—Herbert Levine
*Attorney*—Curtis, Morris & Safford

[57]            ABSTRACT

A process has been provided for fractionating mixtures of hydrocarbons which contain olefins by means of molecular sieves which comprises neutralizing said sieves by impregnating the same with a solution of a strong inorganic base, contacting a stream of hydrocarbons to be fractionated with the sieves thus neutralized, and desorbing the hydrocarbons absorbed by the sieves.

16 Claims, 5 Drawing Figures

PROCESS OF FRACTIONATING HYDROCARBON MIXTURES CONTAINING OLEFINS AND ITS APPLICATION TO THE PURIFICATION OF ISOOLEFINS

This application is a continuation of application Ser. No. 767,005 filed Oct. 10, 1968, and now abandoned.

This invention pertains to a process of fractionating mixtures of hydrocarbons which contain olefins; more particularly, it relates to a process of separating straight-chain olefins by means of molecular sieves and the application of this process to the purification of isoolefins which contain olefins or straight-chain diolefins as impurities.

It is known that certain silico-aluminates have a uniform porous structure such that the diameter of the pores is constant. If one selects from among said silicoaluminates that one whose pore diameter is intermediate between the sizes of the different molecules present, it acts, with respect to said molecules, as a true sieve, the molecules which have a size less than the diameter of the pores penetrating into said sieve, while the other molecules are maintained on the outside; furthermore, as the sieves, like all silico-aluminates, have the property of adsorbing certain hydrocarbons on their surface, only the hydrocarbons which have penetrated into the interior of the pores are retained there, and when the passage of the mixture to be separated stops, there remains then in the sieve only the hydrocarbons which have penetrated into the pores; these hydrocarbons can then be recovered by desorption with an eluent from which they are separated, for instance, by distillation.

Molecular sieves are generally known as a category of natural silico-aluminates, zeolites, but in fact, there are many others, including synthetic molecular sieves such as those manufacture by LINDE Co., a division of UNION CARBIDE CORP.

Molecular sieves have found important applications in the separation of hydrocarbons and in particular for the separation of straight-chain hydrocarbons from branchedchain hydrocarbons, for which purpose they advantageously replace the conventional processes, such as distillation, which makes necessary the use at times, in order to obtain a sufficient purity of the products, of columns of high separating power.

Nevertheless, the commercial molecular sieves present a certain surface acidity which brings about characteristic reactions of acid catalysis, for instance isomerization and polymerization; these reactions which do not take place in the treatment of saturated hydrocarbons occur, on the other hand, when it is desired to fractionate olefin-containing mixtures by means of molecular sieves; the isomerization changes the nature of the olefins contacted with the sieve and the polymerization causes a decrease in the capacity of the latter because of the fouling due to the polymers.

In order to overcome this drawback, it has already been proposed to fractionate olefin-containing hydrocarbon mixtures by means of molecular sieves whose surface acidity has been previously neutralized by means of a nitrogen base such as ammonia. This manner of neutralization is rather easy to carry out, since, as a matter of fact, it is sufficient to pass a stream of gaseous ammonia until the sieve is neutral, but it nevertheless has the drawback of not permitting permanent neutralization of the sieve; as a matter of fact, when the sieve is regenerated to eliminate from it the products which have accumulated therein, for instance by burning, the neutralization ammonia is also eliminated.

The applicant has now perfected a method of neutralizing molecular sieves which imparts to them a chemical neutrality which is permanent even after numerous regenerations; by means of this method, one can neutralize molecular sieves once and for all and use them for the fractionation of olefin-containing hydrocarbon mixtures without causing the isomerization or the polymerization of the olefins.

The process in accordance with the present invention for the fractionating of hydrocarbon mixtures containing olefins by means of molecular sieves is essentially characterized by the fact that the said molecular sieves have been previously neutralized by a solution of a strong inorganic base.

More precisely, mixtures of hydrocarbons containing olefins are fractionated by means of molecular sieves which have been previously neutralized by a solution of a strong inorganic base through which sieves the stream of hydrocarbons to be fractionated is circulated, whereupon the flow of hydrocarbons is stopped and the hydrocarbons which have been adsorbed and desorbed.

The process of fractionation in accordance with the invention can be applied advantageously to the purification of isoolefins.

It is known, as a matter of fact, that isoolefins which are intended for polymerization must have as low an impurity content as possible; for example, the isobutylene intended for the manufacture of so-called "butyl" rubber by copolymerization with isoprene must contain only very small amounts of normal butenes and if possible none at all. Now, the processes used to extract the isoolefins from the hydrocarbon mixtures, for instance, processes in which the isoolefins are selectively adsorbed in an acid such as $H_2SO_4$, supply only isoolefins which still contain straight-chain olefins, although in small quantity. Thus, the isobutylene extracted from a cut of hydrocarbons having 4 carbon atoms per molecules still contains from 0.1 to 2 percent normal butenes as well as butadiene in accordance with the quantities of these products contained in the charges and in accordance with the severity of the absorption in the acid.

It is well known, furthermore, that one can separate the straight-chain hydrocarbons from the branched-chain hydrocarbons by means of molecular sieves, but the characteristic reactions of acid catalysis, for instance, isomerization and polymerization, which take place on commercial molecular sieves due to their surface acidity limit the possibilities of the use of these molecular sieves in the purification of isoolefins.

The process of fractionation in accordance with the invention, applied to the purification of olefins, makes it possible to overcome this drawback.

In accordance with the invention, therefore, isoolefins containing as impurities straight-chain olefins or diolefins are purified by passing the isoolefins to be purified over a molecular sieve which has been previously treated with a solution of a strong inorganic base.

For the carrying out of the invention, one can use all molecular sieves such as, for instance, the natural and artificial zeolites; one can employ, inter alia, the molecular sieves of type A manufactured by LINDE CO., Division of UNION CARBIDE CORP. In the case of the fractionation of a mixture of hydrocarbons having 4 carbon atoms per molecule, a 5 A molecular sieve will be used, that is to say, a sieve whose pores have a diameter of 5 A.

By adapting the characteristic of the sieve to the hydrocarbon mixtures to be fractionated, that is to say, by selecting the diameter of the pores as a function of the size of the molecules, one can employ the invention for the fractionating of mixtures containing olefins having from four to eight carbon atoms per molecule.

The bases with which the neutralization of the sieves is effected are generally bases whose cation is an alkaline metal, for instance, soda, potash and lithium hydroxide, but one can also use other inorganic bases.

The neutralization by the base is effected by immersing the sieve in a solution of the inorganic base. The solvent may be water or an organic solvent; in the latter case, the solvent is generally an alcohol, particularly methanol.

Although the invention may also be carried out with water as solvent of the base, an organic medium is preferred and in particular methanol, since in such case a complete neutralization of the sieve is obtained with a smaller consumption of base while maintaining a practically unchanged adsorption capacity of the sieve, while, on the other hand, neutralization in aqueous medium lowers this capacity, modifying the characteristics of the sieve.

The invention will be described more clearly in the detailed description which follows and in the examples which ill be given. In this description, reference will be had to the accompanying drawings in which.

Figure 1:
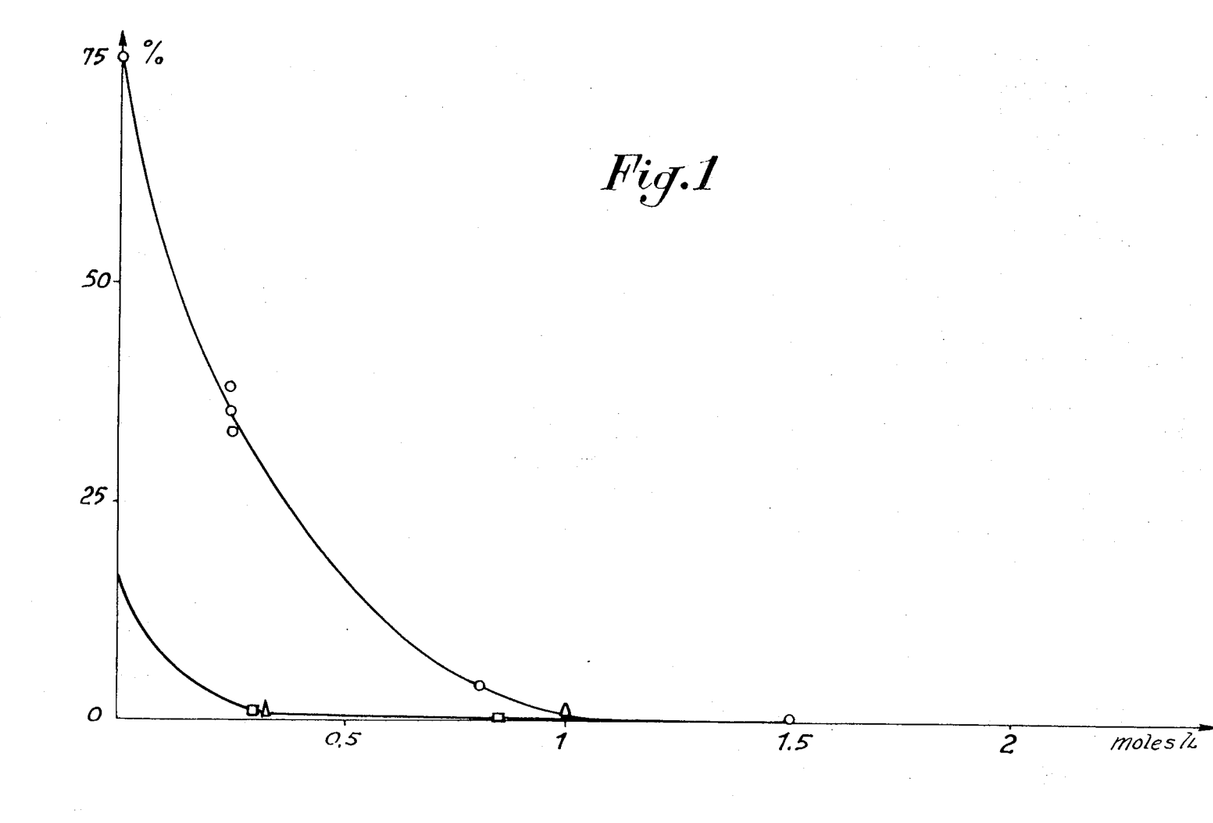
FIG. 1 is a diagram representing the percentage of butene-2 in the efflux of molecular sieves which have been previously neutralized with various solutions and with which butene-1 has been contacted, as a function of the final concentration of the impregnation solution.

The curves of FIG. 1 illustrate the isomerization of butene-1 to butene-2 at a temperature of 100°C by contact for a period of 1 hour with molecular sieves which have undergone different treatments; the percentage by weight of butene-2 in the efflux is plotted on the ordinates, while the concentration of the impregnation solution of the sieve, expressed in mols/liter, is plotted on the abscissas.

The symbols used in FIG. 1 for the different types of treatment have the following meaning:

○ NaOH in methanol solution
□ KOH in methanol solution
△ LiOH in methanol solution
● Acid sieve untreated
+ Acid treated with pure methanol For the fractionating of a mixture containing butene-1, it is found that isomerization thereof into butene-2 is avoided by neutralizing the sieve with a basic solution in methanol whose final concentration at the end of the impregnation is equal to or greater than about 1.2 equivalents per liter.

It is thus seen on basis of this figure that the isomerization of butene-1 to butene-2 in the case of sieves which have retained the same amount of base upon neutralization in methanolic solution differs, depending on whether one uses sodium hydroxide, potassium hydroxide or lithium hydroxide. When the neutralization is effected by means of an aqueous soda solution, it is found that there is no further polymerization of butene-1 when the final concentration of the solution is equal to or greater than 0.05 mol/liter.

Figure 2:
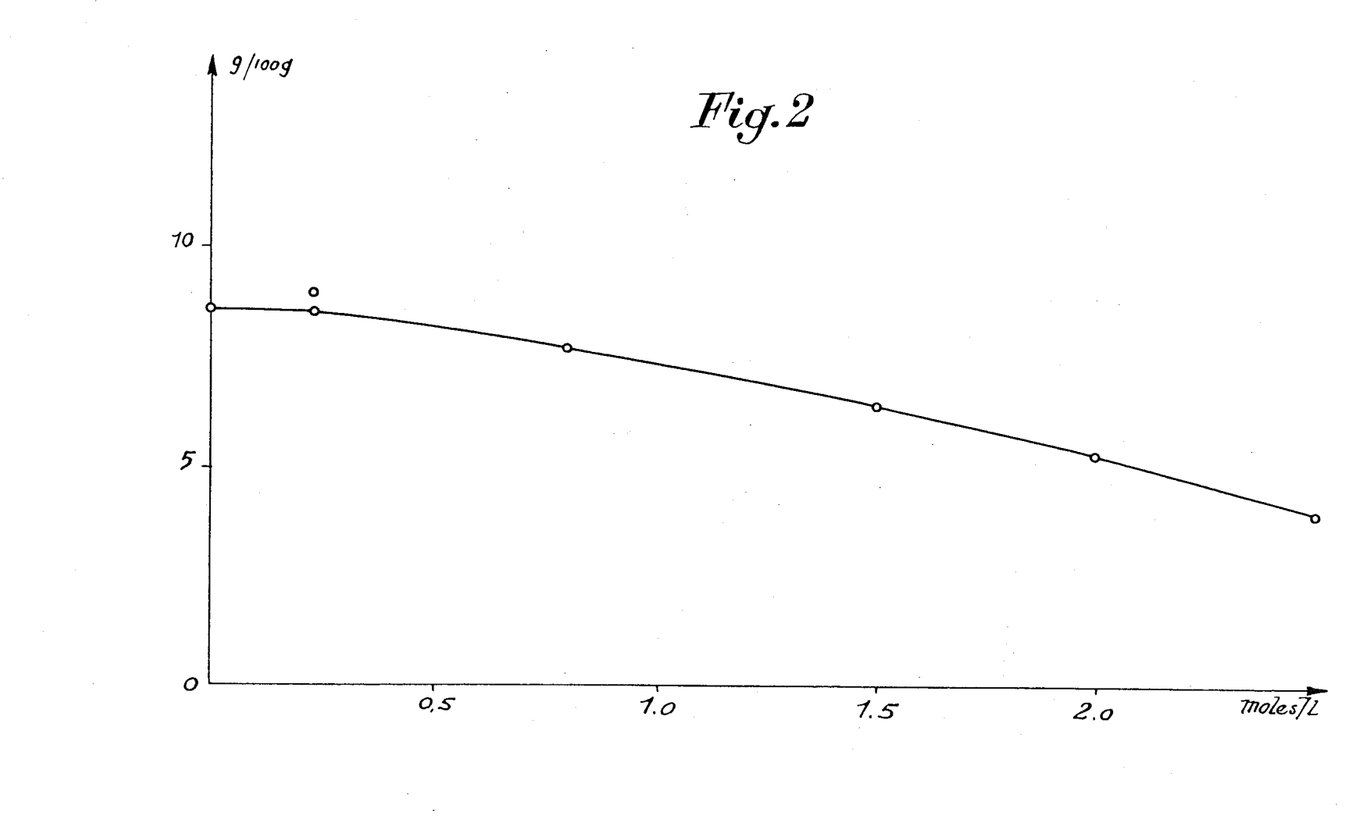
FIG. 2 is a curve showing the butene-1 capacity of a sieve which was previously treated with a methanolic soda solution, as a function of the final concentration of said solution.
Figure 3:
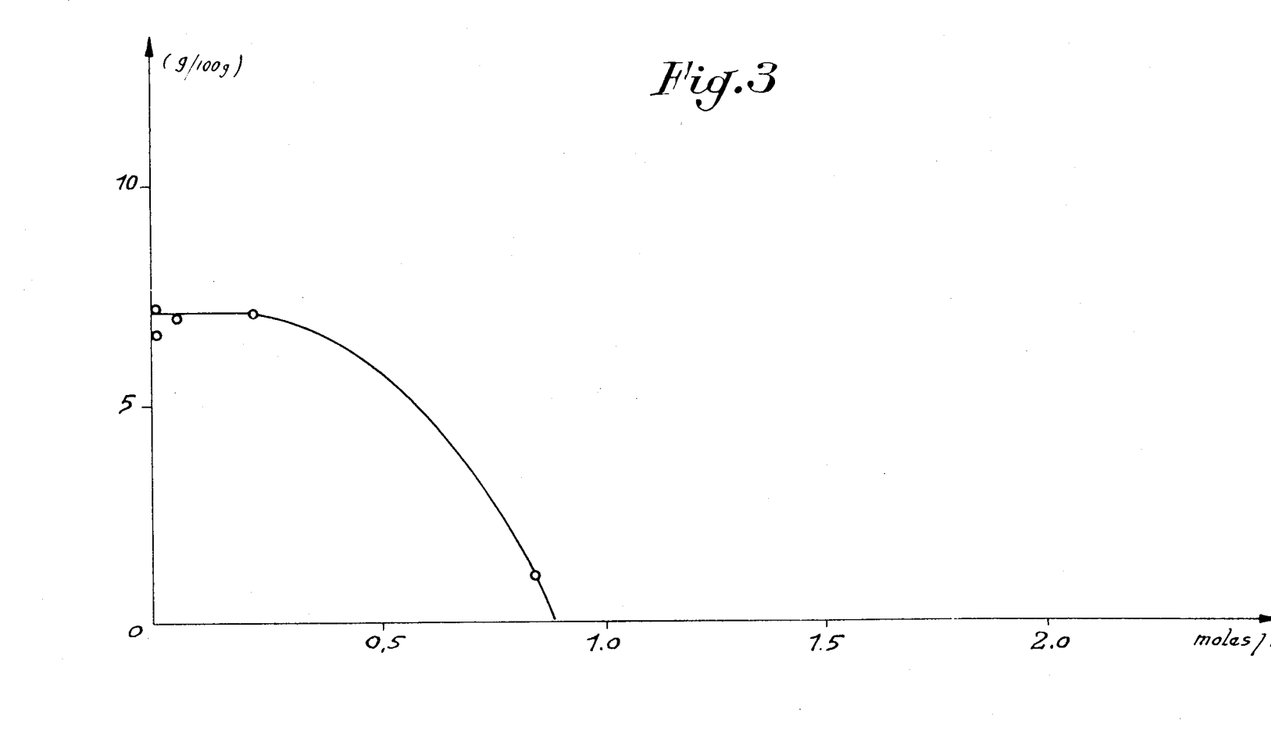
FIG. 3 is a figure similar to FIG. 2 for the event that the impregnation solution is an aqueous soda solution.

The butene-1 capacity of the sieve, after this impregnation, is shown in FIG. 2 in the case of impregnation by a methanolic solution of soda and in FIG. 3 in the case of impregnation by an aqueous solution of soda. In each of these figures, the amount of butene-1 adsorbed, expressed in grams per 100 grams of sieve, is plotted on the ordinates, while the final concentration of the impregnation solution of the sieve, expressed in mols/liter, is plotted on the abscissas. From these two curves, it is seen that impregnation with a methanolic solution leaves the sieve with a higher adsorption capacity for butene-1 than sieves neutralized in aqueous solution, the latter no longer existing when the final concentration of the solution reaches 0.1 mol of soda per liter.

Figure 4:
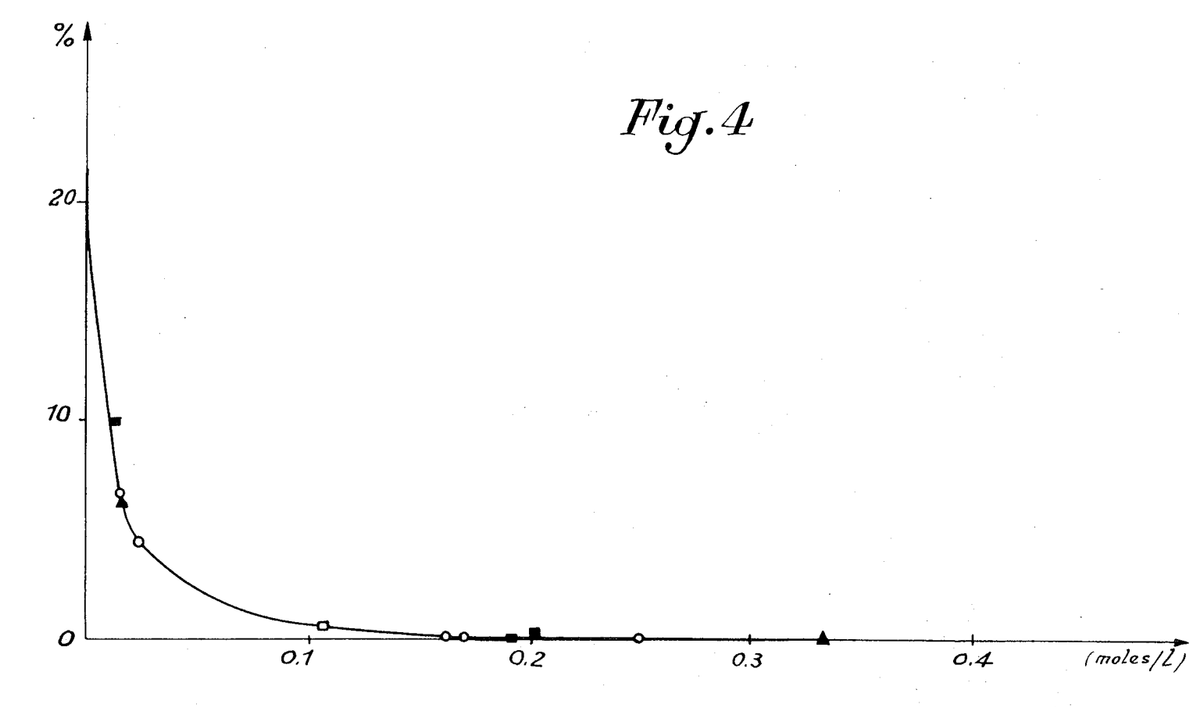
FIG. 4 is a curve indicating the percentage by weight, referred to the weight of the sieve, of the isobutylene which is polymerized on the sieve surface, previously impregnated with various solutions, as a function of the final concentration of the impregnation solution.

From FIG. 4, conclusions similar to those in connection with FIG. 1 are drawn. In this FIG. 4, there has been plotted on the ordinates, by way of example, the percentage by weight of isobutylene in gaseous state under atmospheric pressure, referred to the weight of the sieve, which polymerizes on the surface of the said sieve as a function of the concentration of the base in the solution at the end of the impregnation, plotted on the abscissas and expressed in mols/liter of solution.

The symbols used in this figure have the following meaning:

○ NaOH in solution in $CH_3OH$
□ KOH in solution in $CH_3OH$
● NaOH in solution in water
■ KOH in solution in water
▲ LiOH in solution in water It is seen that there is a minimum final concentration above which the isobutylene no longer polymerizes on the neutralized sieve; this final concentration is the same whether the base is dissolved in water or in methanol. In the case of isobutylene, this final concentration is 0.25 mol/liter, as can be noted from FIG. 1. In general, the final concentration of the impregnation solutions will not be less than 0.1 mol of base per liter of solution and in practice will not exceed 2 mols/liter.

The initial concentration of base in the impregnation solution depends on the quantity of solution contacted with the molecular sieve and the quantity of cation fixed on the said sieve at the end of the impregnation when equilibrium has been established. The amount of cation fixed, as a function of the final concentration of the solution, is shown by way of example in the curves of FIG. 5 in which the basicity fixed on the sieve (expressed in milliequivalents/gram) is plotted on the ordinates, while the final concentration of the basic impregnation solution (expressed in mols/liter) is plotted on the abscissas. The curves shown by way of illustration and not of limitation in FIG. 5 correspond to the case of the neutralization of a molecular sieve of type 5A at 65°C by aqueous solutions of soda (curve I, II, III) and by methanolic solutions of soda (curves I$a$, II$a$, III$a$). Curves I and I$a$ illustrate the variations of the quantity of cation adsorbed $(C_i-C_f)$ V$_i$, in which $C_i$ represents the initial concentration, $C_f$ the final concentration and V$_i$ the initial volume of the pores, while curves II and II$a$, on the one hand, and III and III$a$, on the other hand, represent the quantities of cation fixed on the unwashed sieve and the quantities fixed on the sieve after washing, respectively.

Figure 5:
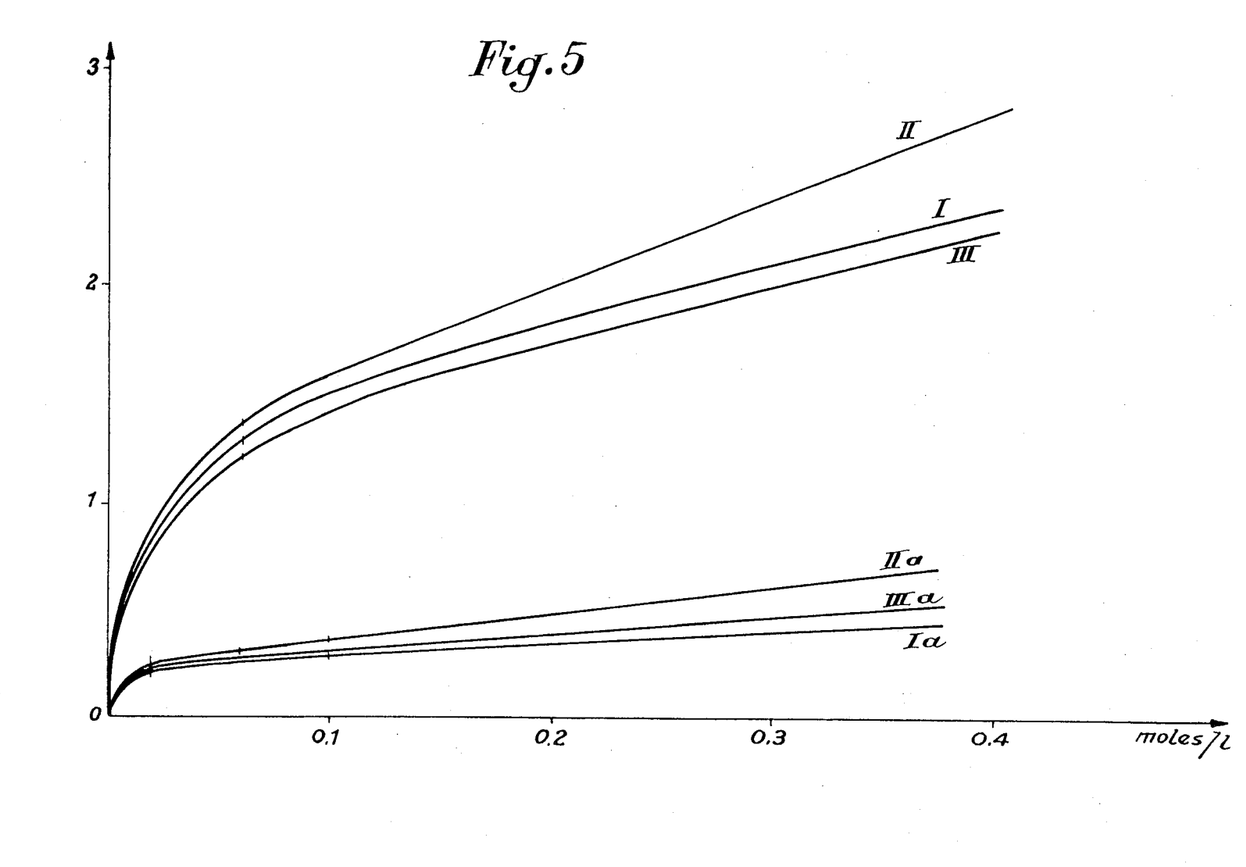
FIG. 5 is a diagram showing the basicity fixed on a molecular sieve by impregnation with various basic solutions, as a function of the final concentration of the impregnation solution.

From this figure, it is seen that for a given final concentration of the solution in equilibrium with the sieve, the basicity fixed on the said sieve is well defined and depends only on the nature of the solvent employed. The sieve is preferably impregnated with a large excess of basic solution so that the initial concentration is close to the final concentration, but other methods of impregnation can be contemplated; for instance, one can start from a solution of an initial concentration less than the final concentration or even from pure solvent and periodically or continuously inject a concentrated solution of the base with which it is desired to treat the sieve.

The temperature at which the neutralization of the sieve is effected is immaterial; it may vary from temperatures below 0°C to the boiling point of the solvent; in practice, one operates at ordinary temperature.

The amount of basic cation fixed on the sieve depends not only on the nature of the solvent but also on the cation used itself. In the case of sodium, as shown in FIG. 5, less than 1 millimol of sodium per gram of sieve is fixed when it is impregnated with a methanolic solution of a final concentration equal to or greater than 0.25 mol/liter, and between 2 and 3 millimols/g are fixed if the same impregnation is effected in aqueous solution.

After the neutralization of the sieve, it is advantageous to wash with pure solvent, whereupon the treated sieve is dried so as to eliminate all traces of solvent from it, and finally the sieve is calcined at elevated temperature, for instance at 450°C.

The separation of the branched-chain hydrocarbons from the straight-chain hydrocarbons may be effected both in gaseous phase and in liquid phase; although the temperature is immaterial, it is preferred to operate at a temperature below 100°C, and the pressure is adjusted so that the batch to be fractionated is in liquid state or in gaseous state, depending on the manner of treatment adopted.

The desorption of the adsorbed compound can be effected by all means known in the art of separation by molecular sieves. One can, for instance, decrease the pressure acting on the sieve or increase the temperature or combine the decrease in pressure with an increase in temperature; one can also sweep the sieve with an inert gas the presence of which lowers the partial pressure of the adsorbed compound and, thus, causes the desorption thereof; finally, one can use a compound which is adsorbable to a greater or lesser extent by the sieve and displaces the adsorbed compound.

In the event that the adsorbed compound is butene-1, the latter manner of separation is preferred; as a matter fact, in order to desorb the butene-1 by reduction of the pressure, it would be necessary to go down to pressures of less than $10^{-2}$ mm of mercury, and one cannot raise the temperature too much, since one then notes the isomerization of butene-1; desorption by an inert gas is equivalent to desorption by decrease in pressure and is difficult to apply to butene-1.

If one desorbs the butene-1 by a compound which is more readily adsorbable by the sieve, one will have an easy desorption, but it will then be necessary to desorb the desorbent by increasing the temperature, or otherwise the selectivity of the sieve will be reduced. In general, it is therefore preferred to desorb the butene-1 by a product which is slightly less adsorbable; the desorption of the desorbent and the subsequent adsorption of butene-1 are facilitated thereby. As desorbent, propane or ethylene, for example, is used, operating preferably at a temperature of about 100°C, although it is possible — but with poorer efficiency — to operate at 20°C.

In the case of a purification if isoolefins on a molecular sieve neutralized in accordance with the invention, in liquid phase or in gaseous phase, one generally elects to operate at ordinary temperature, although a wide range of temperatures can be applied for the carrying out of the invention.

In the case of the purification of isobutylene, one operates in gaseous phase at atmospheric pressure and in liquid phase under a pressure of 5 bars. It will be noted that in this latter case, the practical capacity of the sieve for straight-chain hydrocarbons (butenes and butadiene) is greater than that observed in the case of purification in gaseous phase.

The desorption of the impurities is effected as indicated above in the case of a fractionation operation. However, the increase in temperature which may cause the polymerization of the adsorbed diolefins is avoided, thus making them non-desorbable and lowering the capacity of the sieve. Likewise, reduction of the pressure can be employed only with difficulty, since one would have to lower the pressure considerably in order to obtain sufficient desorption of the impurities; the same is true of desorption by an inert gas.

Therefore, the desorption will generally be effected by displacing the adsorbed impurities by a compound which will be adsorbed on the sieve in their place; there will preferably be selected a compound which is adsorbed less on the sieve than the impurities are; despite the larger quantity of desorbent which must be used in this case, it is found that it is easier than to desorb such a compound by again passing the isoolefin to be purified during the following purification cycle than if one uses a more adsorbable compound.

By way of example, propane or ethylene may be mentioned as agents for the desorbing of straight-chain olefins and diolefins contained as impurities in isoolefins. In general, one selects a desorbing agent which can easily be separated from the isoolefin to be purified. Propane and ethylene can be easily separated from the isoolefins and in particular from isobutylene by distillation; in the event, the polymerization of the isobutylene is not impeded by the presence of a small amount of ethylene or a small amount of propane.

The desorption by displacement of the adsorbed impurities will generally be effected at the same temperature and the same pressure as the adsorption, but this pressure and this temperature can be varied without going beyond the scope of the invention; the applicant has found that an increase in the desorption pressure had a favorable effect on the adsorption capacity of the sieve when one operates in liquid phase.

In accordance with the invention, it is furthermore advantageous to supplement the desorption by purging with an inert gas; the impurities fixed on the sieve are thus desorbed by the desorbent and by the purging. In the event that the desorption is effected under pressure, it can be supplemented by expansion to atmospheric pressure and by purging with an inert gas, which imparts the sieve a higher adsorption capacity for the following cycle.

The invention is furthermore illustrated by the following examples, which are not of limitative character.

EXAMPLE 1

It is proposed to remove in accordance with the invention the butene-1 contained in a mixture having the following composition by volume:

| | |
|---|---|
| isobutane | 70.13% by weight |
| n-butane | 0.05% by weight |
| butene-1 | 28.95% by weight |
| isobutene | 0.59% by weight |
| trans-butene-2 | 0.16% by weight |
| cis-butene-2 | 0.12% by weight |

For this there is available 200 cc of a "LINDE" 5 A molecular sieve the pores of which have a diameter of 5A. The neutralization of this sieve is effected by immersing it for 24 hours in 2 liters of aqueous sodium hydroxide solution the initial concentration of which is about 0.3 mol/liter and the final concentration 0.22 mol/liter, that is to say, higher than the concentration of 0.05 mol/liter beyond which no further isomerization of butene-1 is noted. From the curve of FIG. 3, it can be seen that for this final concentration, the butene-1 capacity is 7 g per 100 g of sieve. The sieve is then dried and the calcined at 400° to 500°C under a pressure of 1 mm of mercury.

A first adsorption is effected at ambient temperature, but the heat of adsorption of the butene-1 on the sieve causes the temperature to rise rapidly to 80°C. The rate of passage of the mixture, considered in liquid state, is 0.27 volume of mixture per volume of sieve per hour. At the beginning of the adsorption, it is found that the butene-1 is extracted 100 percent.

When butene-1 appears in the efflux, the temperature is brought to 100°C, and it is then noted that the charge reemerges complete when the screeen has adsorbed 6.98 percent of its weight of butene-1. It is also noted that the sieve adsorbs 0.7 percent by weight isobutene.

The butene-1 is then desorbed with propane at 100°C, the propane being passed over the sieve at the rate of 60 volumes of gas per volume of sieve per hour. The desorption of the desorbable butene-1 is terminated upon passage over the sieve of 0.7 mol of propane per 100 g of sieve.

The results obtained in the following cycles are given in the following table for 100g of sieve. The temperature is maintained constant at 100°C in each cycle; the propane is desorbed by the new portion of charge passed over the sieve after the desorption has terminated.

TABLE

| No. of the Cycle | Adsorption of Butene-1 | | Desorption of Butene-1 | | |
|---|---|---|---|---|---|
| | Butene-1 Fixed (g) | Propane Desorbed (g) | Butene-1 Desorbed (g) | Propane Absorbed (g) | Purity of Butene-1 |
| I | 6.98 | — | 4.06 | 2.21 | 95.3 |
| II | 3.76 | 2.04 | 3.78 | 2.02 | 95.7 |
| III | 4.0 | 2.01 | 3.62 | 1.59 | 94.1 |
| IV | 3.79 | 1.84 | 3.64 | 1.92 | 95.8 |

From this table, it can be seen that the sieves neutralized in accordance with the invention permit the recovery of butene-1 contained in a charge of $C_4$ hydrocarbons containing in particular isobutane and butene-1 with a purity of about 95 percent, the impurities consisting in particular of isobutane; it is noteworthy that the isomerization of the butene-1 to butene-2 is negligible, while with a non-neutralized sieve, this isomerization may reach a figure of 76 percent.

Furthermore, the preceding sieve can be used indefinitely without it being necessary to neutralize it; when it has become fouled, it can be regenerated by any known means, for instance, by burning. Thus, a sieve in accordance with the invention served for the separation of butene-1 for three months without the quantity of butene-1 isomerized to butene-2 being substantial, despite several regenerations of the sieve by burning off the impurities at 450°C.

It is very easy to separate the butene-1 from the propane which serves to desorb it by distillation; as a matter of fact, the propane boils at −42.1°C and the butene-1 at −6.3°C.

EXAMPLE 2

This example relates to the purification of isobutylene:

100 g of a 5A molecular sieve (that is to say, a sieve whose pores have a diameter of 5A), sold by Linde Co., are immersed in an aqueous sodium hydroxide solution containing 0.34 mol of sodium hydroxide per liter, the concentration of which is maintained at this value by periodic addition of a concentrated sodium hydroxide solution; the liquid is then removed from the sieve when equilibrium has been established between the solution and the sieve, and thereupon it is washed with a large excess of water and dried at 110°C; finally, it is calcined at 450°C under a pressure of 1 mm of mercury. From FIG. 2, it can be seen that the quantity of sodium hydroxide fixed on the sieve is 2 millimols per gram of sieve.

It is proposed to purify isobutylene the average composition of which is as follows:

| | |
|---|---|
| isobutane | 0.06% by weight |
| n-butane | 0.03% by weight |
| butene-1 | 0.08% by weight |
| isobutylene | 98.93% by weight |
| trans-butene-2 | 0.03% by weight |
| cis-butene-2 | 0.04% by weight |
| butadiene | 0.83% by weight |

350 g of the above charge are passed in gaseous state at 25°C and atmospheric pressure at a rate of 48 liters per hour. Thereupon the impurities adsorbed on the sieve are desorbed by the passage of 21.3 g of ethylene at the rate of 60 volumes of ethylene per volume of sieve per hour, thus desorbing 2.07 g of butadiene and 0.66 g of butenes.

During a second adsorption cycle, 192 g of isobutylene are treated and desorption is effected under the same conditions as previously. The adsorption-desorption cycle is repeated a large number of times without noting any loss of isobutylene by polymerization; and furthermore the isobutylene treated contains merely isobutane and 0.4 percent by weight ehtylene; if necessary, one can then remove the ethylene by distillation, but in practice, ethylene will be left, since it does not affect the polymerization of isobutylene.

The regeneration of this catalyst is effected by burning off in air at high temperature all the deposits which have accumulated on the molecular sieves and the said sieves can be reused without further treatment directly for a new series of adsorption-desorption cycles.

EXAMPLE 3

100 grams of molecular sieve 5A are neutralized by immersing the sieve material in a solution of sodium hydroxide in methanol whose equilibrium concentration at the end of the impregnation is 0.365N. Thereupon the sieve is dried at about 110°C and calcined at 450° ± 10°C.

Let us assume that it is desired to purify on this sieve a charge of isobutylene containing 1.09 percent by weight butadiene. After several cycles of absorption during which the charge to be purified is passed over the sieve and of desorption of the adsorbed butadiene by ethylene, 270 grams of the charge of isobutylene to be purified are passed in liquid phase at the rate of 0.85 volume of liquid charge per volume of sieve per hour; the relative pressure is 5 bars and the temperature is constant at 25°C.

Thereupon the adsorbed butadiene is desorbed, by passing 21.3 grams of ethylene at a pressure of 5 bars gauge at 25°C at a rate of 60 volumes of gaseous ethylene per volume of sieve per hour and then expanding to atmospheric pressure and purging the sieve with 9 liters of nitrogen.

The amount of butadiene thus desorbed is 2.86 grams, namely 97.2 percent of butadiene contained in the treated charge.

The charge purified on the molecular sieve represents 267 grams of isobutylene containing 0.08 grams of butadiene, namely 0.03 percent.

The two above examples show that one can purify charges of branched-chain olefins by means of sieves neutralized by a base in accordance with the invention, the said sieves not losing their neutrality even after regeneration by burning off of the impruities.

The purification can be carried out both in gaseous phase and in liquid phase and the adsorbed impurities can be readily desorbed by a gas which is adsorbed in their place, in the present case, ethylene.

EXAMPLE 4

Let us assume that it is desired to purify isobutylene containing butene-1 as impurity. For this purification, one employs two sieves, neutralized by an aqueous solution of sodium hydroxide and by a methanolic solution of sodium hydroxide, respectively.

The final concentration of the impregnation solution, as determined, above which isobutylene is no longer polymerized, is 1 mol of sodium hydroxide per liter.

When the purification of the isobutylene is effected by passing it at 100°C over each of the sieves, it is noted that in the case of the sieve neutralized by the aqueous sodium hydroxide solution, the isobutylene is not purified, the capacity of the sieve for butene-1 being cancelled out by the neutralization and modification in structure of the sieve brought about by the fixing of sodium hydroxide on the sieve. On the other hand, 7.3 percent of butane-1, referred to the weight of the sieve, is adsorbed on the sieve neutralized by the methanolic solution, which makes it possible to purify the isobutylene.

This example shows the superiority of the sieves treated with a solution of a strong base in an organic solvent.

We claim:

1. A process for separation of hydrocarbons which contain butenes as straight-chain olefins and isobutylene as branched chain olefins which are sought to be separated by means of molecular sieves, said process comprising the steps of: neutralizing said sieves by impregnating the same with an aqueous solution of a strong inorganic base containing no nitrogen as base, said solutions measured after impregnation of said sieves, having a concentration between 0.1N and 2N, wherein said solution, after impregnation of said sieve is of substantially the same concentration; contacting said olefin hydrocarbons to be separated with the sieves thus neutralized to adsorb the straight chain olefin, and desorbing the olefin adsorbed by the sieves.

2. The separation process according to claim 1, wherein the molecular sieves are type A sieves.

3. The separation process according to claim 1, and wherein the inorganic base is an alkaline cation base.

4. The separation process according to claim 1, wherein the inorganic base is sodium hydroxide and the solution measured after impregnation of said sieves has a concentration between 0.25N and 0.9N.

5. The separation process according to claim 1, and wherein the sieve is dried and calcined before its use.

6. The separation process according to claim 1, and wherein desorbing is effected either by lowering the pressure or by increasing the temperature of the sieve, or by sweeping the sieve with an inert gas, or by displacement of the adsorbed compounds by a compound which is more adsorbable by the molecular sieve than the adsorbed compound itself.

7. A process for the fractionating of a mixture containing butenes as straight-chain olefins and isobutylene as branched-chain olefin comprising the steps of neutralizing a molecular sieve having a pore diameter of 5A with a solution of an alkaline base which is an aqueous or an alcohol solution, the concentration of which before and after neutralizing of said sieve being substantially the same and being from 0.1N to 2N, the sieve being then dried and calcined after its neutralization, said alkaline base containing no nitrogen as base; passing the mixture of olefins over the sieve which has thus been neutralized while maintaining a temperature between 80° and 100° C, stopping the passage of said mixture when said straight-chain olefin appears in the efflux; desorbing with ethylene or propane, the adsorbed straight-chain olefin from the molecular sieve; stopping the passage of the desorbent when no further straight-chain olefin discharges; resuming the passage of the mixture to be fractionated, and again repeating the above sequence of fractionating steps, the straight-chain hydrocarbons being separated from the desorbent gas by distillation.

8. A process according to claim 7 and wherein the alkaline base is sodium hydroxide in an aqueous solution, the concentration of which is such that the final concentration of the solution in equilibrium with the sieve is between 0.25N and 0.9N.

9. A process according to claim 7, characterized by the fact that the alkaline base is sodium hydroxide in a methanolic solution, the final concentration of which in equilibrium with the molecular sieve is between 0.1N and 2N.

10. A process for purification of isobutylene containing as impurities n-butene and/or butadiene, said process comprising the steps of passing the charge of isobutylene to be purified over a molecular sieve, the diameter of the pores of which is about 5A and which has been previously treated by a solution of sodium hydroxide having a final concentration of 0.1N to 2N in equilibrium with the molecular sieve wherein the temperature at which the neutralization of the sieve by means of the sodium hydroxide solution has been effected is at about ambient temperatures and wherein the molecular sieve thus treated has been calcined at a temperature above 400°C after neutralization.

11. The purification process according to claim 10, and wherein the solution of sodium hydroxide is in an solution having a final concentration between 0.25N and 0.9N in equilibrium with the molecular sieve.

12. The purification process according to claim 10, and wherein sodium hydroxide is in methanol.

13. The process according to claim 10, and wherein the diolefin purification operation is carried out in vapor phase.

14. The process according to claim 10, and wherein the isoolefin purification is carried out in liquid phase.

15. A process for separation of hydrocarbons which contain butenes as straight chain olefins and isobutylene as branched-chain olefins which are sought to be separated by means of molecular sieves, said process comprising the steps of: neutralizing said sieves by impregnating the same with an alcoholic solution of a strong inorganic base containing no nitrogen as base, said solutions measured after impregnation of said sieves, having a concentration between 0.1 N and 2 N, and wherein said solution, after impregnation of said sieves, is of substantially the same concentration, contacting said olefin hydrocarbons to be separated with the sieves thus neutralized to adsorb the straight chain olefins, and desorbing the olefin adsorbed by the sieve.

16. A process as claimed in claim 15 and wherein the strong inorganic base is in a methanolic solution.

* * * * *